US011205972B2

(12) United States Patent
Post

(10) Patent No.: US 11,205,972 B2
(45) Date of Patent: Dec. 21, 2021

(54) STATOR POSITIONER FOR ELECTROSTATIC GENERATOR ELECTRODES AND NEW ELECTRODE DESIGN

(71) Applicant: Lawrence Livermore National Security, LLC, Livermore, CA (US)

(72) Inventor: Richard F. Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 364 days.

(21) Appl. No.: 16/368,478

(22) Filed: Mar. 28, 2019

(65) Prior Publication Data

US 2019/0222144 A1 Jul. 18, 2019

Related U.S. Application Data

(63) Continuation of application No. 14/986,477, filed on Dec. 31, 2015, now Pat. No. 10,396,687.

(60) Provisional application No. 62/207,877, filed on Aug. 20, 2015.

(51) Int. Cl.
*H02N 1/08* (2006.01)
(52) U.S. Cl.
CPC ..................... *H02N 1/08* (2013.01)
(58) Field of Classification Search
CPC ........................................ H02N 1/08
USPC .......................................... 310/309
See application file for complete search history.

(56) References Cited

U.S. PATENT DOCUMENTS

| 2,577,446 | A | | 12/1951 | Bosch |
|---|---|---|---|---|
| 2,610,994 | A | | 9/1952 | Bosch et al. |
| 2,818,513 | A | * | 12/1957 | Felici ........................ H02N 1/08 310/309 |
| 3,527,992 | A | * | 9/1970 | Bright ...................... H02N 3/00 318/116 |
| 3,612,919 | A | | 10/1971 | Herb et al. |
| 4,789,802 | A | | 12/1988 | Miyake |
| 5,847,480 | A | * | 12/1998 | Post .................... F16C 32/0436 310/90.5 |
| 6,314,835 | B1 | | 11/2001 | Lascelles et al. |
| 7,233,087 | B2 | | 6/2007 | Watson |
| 7,834,513 | B2 | | 11/2010 | Post |
| 8,760,021 | B2 | | 6/2014 | Post |
| 9,270,203 | B2 | | 2/2016 | Post |
| 9,479,085 | B1 | | 10/2016 | Ludois |
| 2008/0252162 | A1 | * | 10/2008 | Post .................... F16C 32/0408 310/90.5 |
| 2013/0106240 | A1 | | 5/2013 | Tweedie |
| 2013/0106317 | A1 | | 5/2013 | Ludois |

(Continued)

FOREIGN PATENT DOCUMENTS

WO 03-105167 12/2003

OTHER PUBLICATIONS

International Search Report and Written Opinion for PCT/US16/46255, corresponding to U.S. Appl. No. 14/986,477, 11 pages.

*Primary Examiner* — Alexander Talpalatski
(74) *Attorney, Agent, or Firm* — Zilka-Kotab, P.C.

(57) ABSTRACT

A mechanical system is provided for maintaining a desired gap between a stator electrode array and a rotor electrode array by employing repelling magnets on the inner surface of the rotor and on movable carts that support azimuthally segmented stator arrays.

21 Claims, 8 Drawing Sheets

(56) References Cited

U.S. PATENT DOCUMENTS

| | | |
|---|---|---|
| 2014/0055002 A1 | 2/2014 | Nakatsuka et al. |
| 2014/0252914 A1 | 9/2014 | Post |
| 2015/0070941 A1 | 3/2015 | Suzuki et al. |

\* cited by examiner

STATOR POSITIONER FOR ELECTROSTATIC GENERATOR ELECTRODES AND NEW ELECTRODE DESIGN

CROSS-REFERENCE TO RELATED APPLICATIONS

This is a continuation of U.S. patent application Ser. No. 14/986,477 titled "Stator Positioner for Electrostatic Generator Electrodes and New Electrode Design" filed Dec. 31, 2015, incorporated herein by reference. U.S. patent application Ser. No. 14/986,477 claims the benefit of U.S. Provisional Patent Application No. 62/207,877 titled "Stator Positioner for Electrostatic Generator Electrodes and New Electrode Design," filed Aug. 20, 2015, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to a problem associated with the use of an electrostatic generator mounted on a spinning rotor that is subject to radial growth associated with centrifugal force acting on the rotor, and more specifically, it relates to a simple mechanical system for maintaining the gap between the stator electrode array and the rotor electrode array as the rotor is subject to radial expansion and contraction.

Description of Related Art

When charged from a low speed, the rotor of an electromagnetic battery (EMB)/flywheel energy storage device expands because of centrifugal forces. In a large EMB, this expansion can be of order 2 centimeters or more. If the rotor electrodes are mounted on the outer or inner surface of the rotor, this expansion can change the rotor/stator gap by an unacceptably large amount.

The conventional approach to the expansion problem stated above would be to use position sensors and servo systems to compensate for the change in the spacing between the rotor and stator electrodes occurring during charging and discharging the EMB. A simplified means for moving the stator electrodes so as to maintain a constant gap is desired.

SUMMARY OF INVENTION

The mechanical system described herein solves a problem associated with the use of an electrostatic generator mounted on a spinning rotor that is subject to radial growth associated with centrifugal force acting an the rotor. In particular, the invention is directed to a mechanical system for maintaining constant the gap between the stator electrode array and the rotor electrode array by employing repelling magnets on the inner surface of the rotor and on movable carts that support azimuthally segmented stator arrays.

The problem addressed by this invention is one that is important to solve in designing the stator and rotor electrode systems of E-S generator/motors when the rotor electrodes are attached to the rotor. The problem is how to compensate for the expansion and contraction of the radius of the rotor (owing to centrifugal force) of an EMS that occurs as it is charged or discharged. A simple mechanically-based system has been described for controlling the rotor/stator electrode spacing in an electrostatic motor/generator system the rotor electrodes of which are mounted on the outer or inner surface of the rotor of the EMB. The positioning system acts through the use of the repelling force between a ring of permanent magnets on the rotor and stationary permanent magnets pushing on spring-loaded lever arms. These arms are coupled through the use of a rail-guided "cart" to azimuthally segmented stator electrode arrays. It is also shown that the system can be designed so that it also can compensate for the variation of power output with speed that is common to generators, either electrostatic or electromagnetic. Finally, an improved version of the stator electrode structure involving tailoring the thickness and gaps of dielectric inserts is described. This new form of stator design can result in major gains in the output of the E-S generator relative to the older design.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1A:
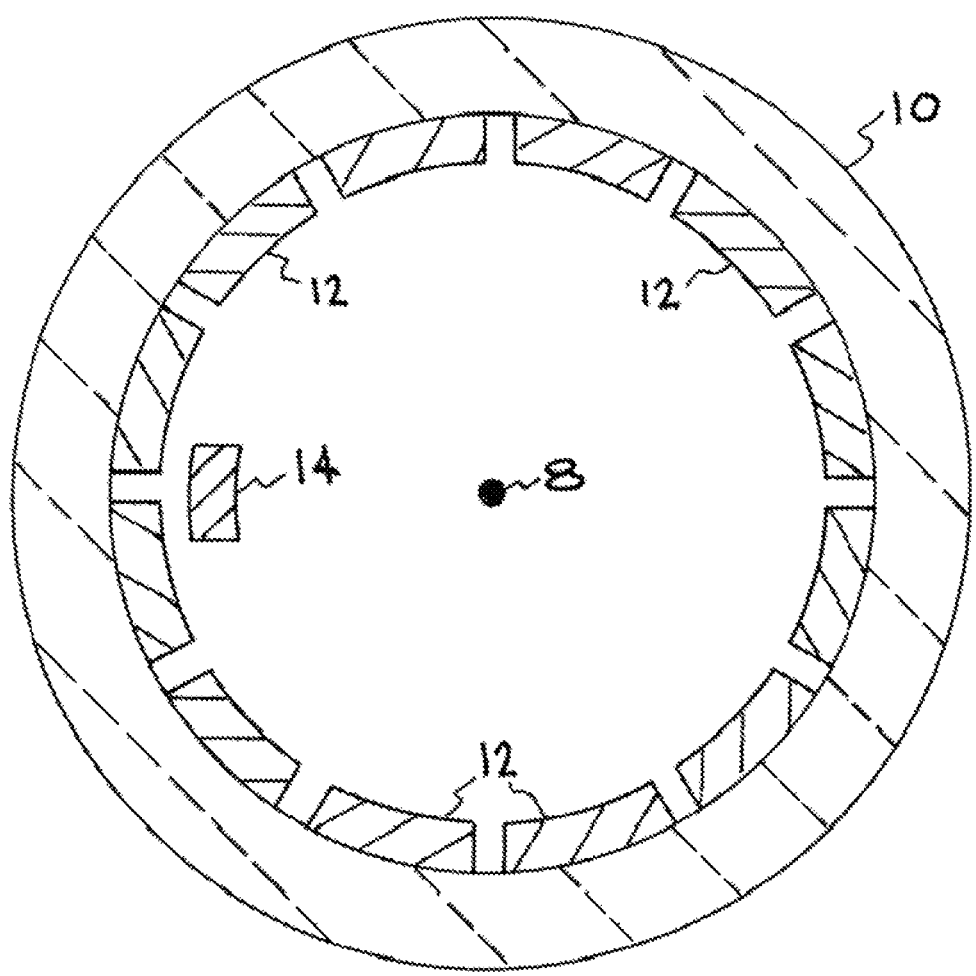
FIG. 1A is a schematic drawing showing an axial view in cross section of the fiber composite rotor of an EMB with an inner radially polarized permanent magnet ring and one of the driver magnets of the present invention along with oppositely polarized magnet ring.

This invention solves a problem that is associated with the use of an electrostatic generator/motor in an electromagnetic battery (EMB)/flywheel energy storage device. When charged from a low speed, the rotor of the EMB expands because of centrifugal forces. In a large EMB, this expansion can be of order 2 centimeters or more. If the rotor electrodes are mounted on the outer or inner surface of the rotor, this expansion can change the rotor, stator gap by an unacceptably large amount. This invention employs a mechanical means for moving the stator electrodes so as to maintain a constant gap. Although it is possible to attached electrical to the mechanical means, they do not contribute to the mechanical operation of the invention. For example, electrical elements could be attached to the mechanical means to electrically monitor the expansion or contraction of the rotor as well as to monitor the gap, but in the present invention, such electrical elements are not part of the mechanical mean or mechanism of the present invention. The apparatus and its method of operation involve the use of a ring of permanent magnets mounted on the inner surface of the rotor. This magnet ring is polarized radially. Its field acts to repel small stationary magnets that are attached to a "cart" that is constrained to move radially by guide rods or guide tracks. At the outer end of these carts there are attached azimuthal segments of the stator electrode system. To ensure that the cart movement follows the expansion of the rotor, tension or compression springs are attached to the cart so as to transfer the repelling force of the ring on the "stationary" magnets at an essentially constant gap between them. This document also describes a stator design that is especially suited for use with the positioner. The invention has a variety of uses such as in flywheel storage systems or other rotating machinery, for vehicular or stationary use or in magnetically levitated rotating systems.

Electrostatic generator/motors of the type described, for example, in U.S. Pat. No. 7,834,513 B2, when used in flywheel energy storage systems (electro-mechanical batteries—EMBs), employ rotor and stator electrode assemblies with a narrow gap (e.g., 2.0 millimeters) between them. Among the various designs for the rotor and stator electrodes are ones that involve rotor electrodes mounted directly on the inner or outer surface of the rotor, with matching stator electrodes that are within a few millimeters of the surfaces of the rotor electrodes. However, during the charging and discharging of the EMB, the centrifugal forces on the rotor will vary. This variation will cause a varying expansion of the inner and outer radii of the EMB rotor. In a large fiber composite rotor (e.g., 1.0 m outer radius), this change in radius between the fully charged state and the discharged state can be more than 2 centimeters. However, a change in the gap between the rotor and stator electrodes of this amount would severely impact the performance of the E-S generator during discharge. One embodiment of this invention provides a solution to this problem for E-S generators where the stator electrodes are mounted facing the outer surface of the rotor, with the rotor electrodes being mounted on that surface. Another embodiment of this invention is utilized when the stator electrodes are facing the inner surface of the rotor. In the material to follow, an example of a system for use in an EMB with its rotor electrodes mounted on the outer surface of the rotor will be described. This description also will disclose a new stator electrode design. Computer simulations employing this new configuration will be used in demonstrating the effectiveness of the stator positioner system described below. Based on this description, those skilled in the art will understand the wide variety of configurations for this concept. Examples of alternate configurations will be discussed herein.

The conventional approach to the expansion problem stated above would be to use position sensors and servo systems to compensate for the change in the spacing between the rotor and stator electrodes occurring during charging and discharging the EMB. The invention described here eliminates the need for servo-based systems by employing permanent magnets and mechanical coupling to accomplish the task.

FIG. 1A is a schematic drawing showing an axial view (see axis 8) in cross section of a fiber composite rotor 10 of an EMB with an inner radially polarized permanent magnet ring 12 (which may be segmented as shown) and one of the driver magnets 14 polarized radially, but oppositely to that of magnet ring 12, so that the driver magnets 14 are repelled by the permanent magnet ring 12. Axis 8 extends longitudinally in the direction perpendicular to the plane of the page. Note that the magnets 12 and 14 may extend for the length of the cylinder, or be shorter lengths placed at any point along the length of the rotor. This drawing does not show the electrodes attached to the outer wall of the rotor and further does not show the stator electrodes facing the rotor electrodes. Some examples of rotor/stator configurations, as well as E-S and EMB circuitry, usable in the present invention are shown in U.S. patent application Ser. No. 13/796,678, incorporated herein by reference.

Figure 1B:
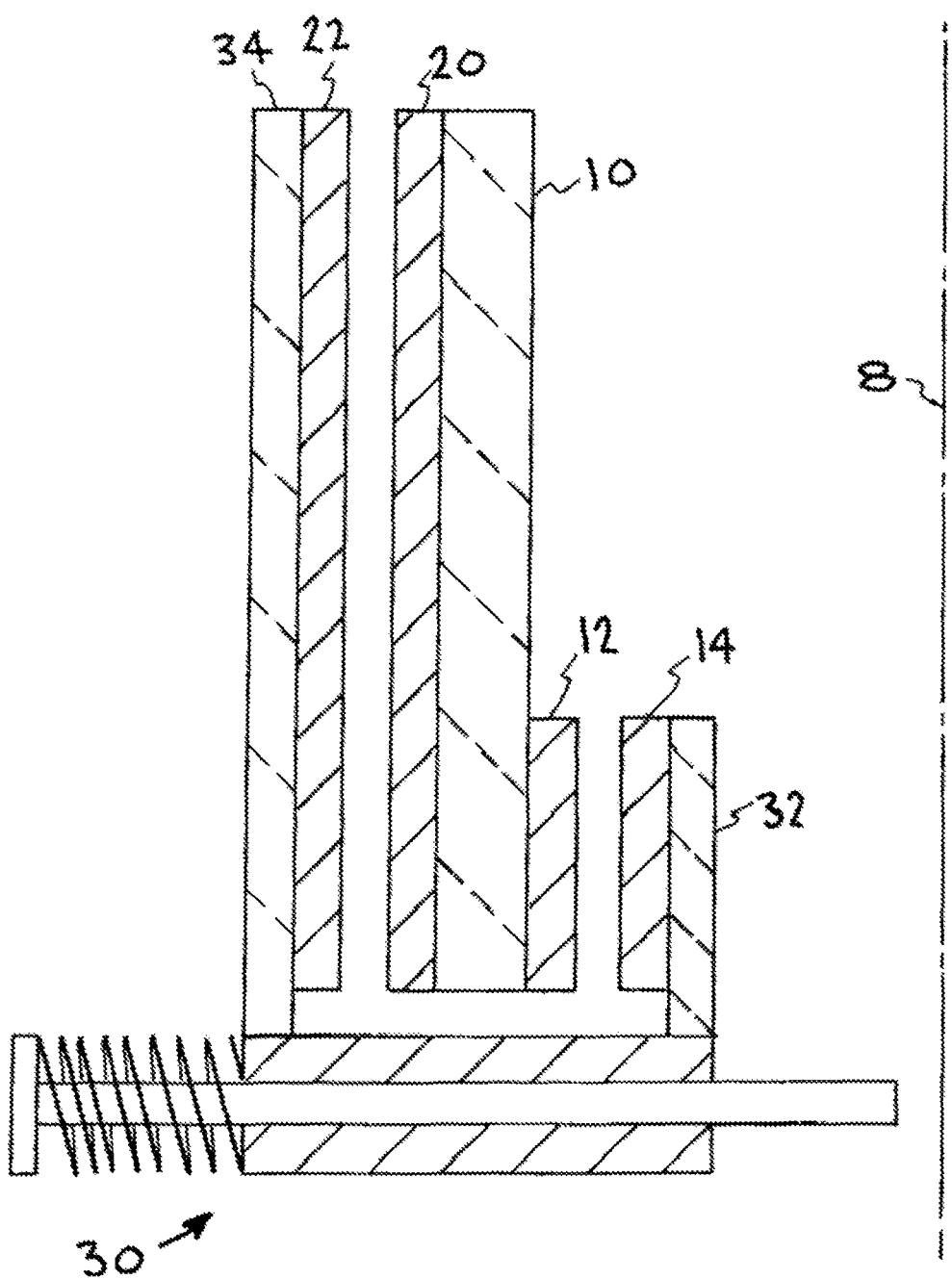
FIG. 1B is a schematic drawing showing a cross-sectional view that is orthogonal to the axial view of FIG. 1A.

FIG. 1B is a schematic drawing showing a cross-sectional view that is orthogonal to the axial view of FIG. 1A. This figure includes additional elements. For example, this figure includes rotor electrodes attached to the outer wall of the rotor. The figure further includes stator electrodes facing the rotor electrodes and spaced therefrom and further attached to one of the arms of the present stator of the positioner. The figure shows half of the rotor. As in FIG. 1A, the entire rotor is centered about longitudinal axis 8. This view shows that on the lower end of the inner surface of the rotor 10 there are attached (or may be embedded) the permanent magnet blocks forming the circular magnet array 12, where the blocks are polarized in the radial direction. Just inside this ring magnet are located driver magnet ring 14 segments polarized radially in the opposite direction relative to array 12 so as to produce a repelling force between each such segment of driver magnet ring 14 and the circular magnet array 12. The driver magnet ring 14 segments are attached to a support 32. The figure also shows the rotor electrodes 20 attached to the outer wall of rotor 10. Stator electrodes 22 are attached to a support 34 that is part of the carriage 30 depicted in FIG. 1C and in FIG. 1D. FIGS. 11A and 11B of U.S. patent application Ser. No. 13/796,678 show a system having a rotor 1000 located outside of stator pair 1010 and 1012. The present invention, as for example shown in FIG. 1B, can be similarly configured except that in FIG. 1B the stator is on the outside of the system. Note again that the present invention con be configured with the rotor electrodes on the inside wall of the rotor and the stator electrodes also within the rotor and facing outward towards the rotor electrodes.

Figure 1C:
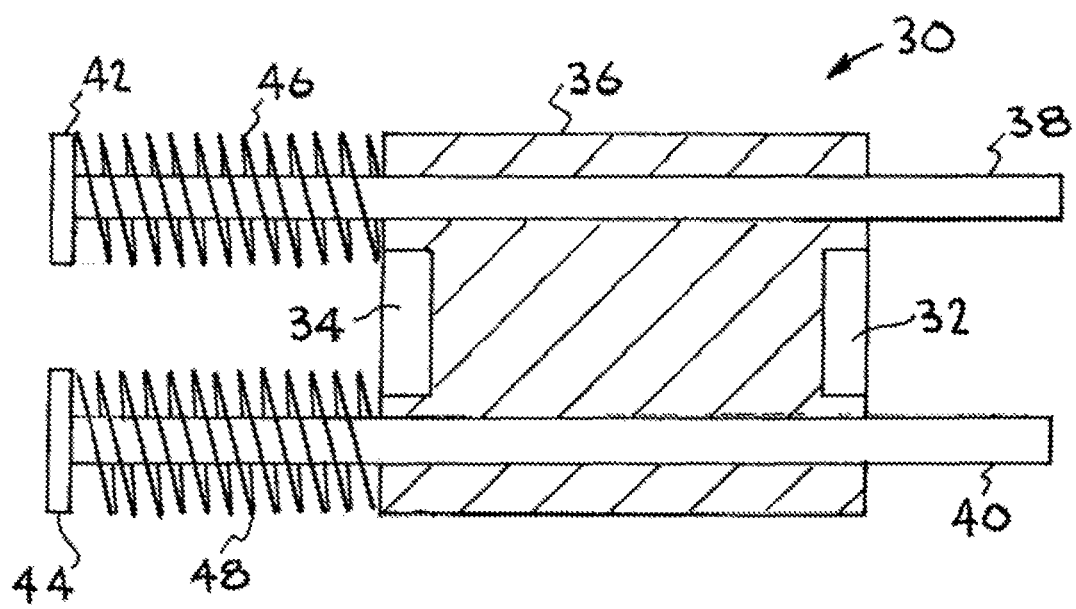
FIG. 1C is a schematic drawing of a side view of an exemplary movable carriage.
Figure 1D:
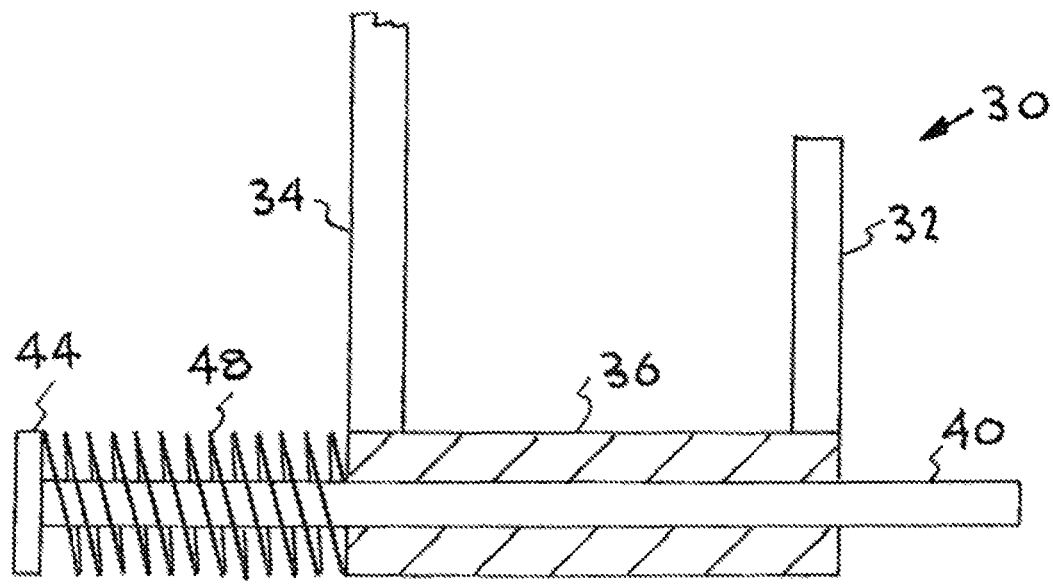
FIG. 1D is a schematic drawing of a top view of an exemplary movable carriage.

Schematic drawings of a side view and a top view of exemplary movable carriage 30 are shown in FIG. 1C and FIG. 1D respectively. As discussed herein, this cart is coupled magnetically to the inner surface of the rotor by the relatively stationary permanent magnet(s) 14 shown in FIGS. 1A and 1B. The permanent magnet(s) 14 are stationary relative to the rotor. For example, the EMB may be located in a moveable system such as a vehicle. These carts provide support for the segmented stator electrodes, the inner surfaces of which face the vertically oriented metal rotor electrode strips that are bonded to the outer surface of the rotor.

Each segmented driver magnet is mounted on a support arm 32, which is shown in FIGS. 1B, 1C and 1D. Support arm 32 is connected to the support carriage body 36 that is in turn supported by a pair of rods 38, 40 that pass through the carriage body. An end piece 42 is attached to rod 38. Another end piece 44 is attached to rod 40. Note that these end pieces are attached to a support that is fixed relative to axis 8. The end pieces may be attached to the inner wall of a vacuum chamber that houses the EMB. Rod 38 passes through tension spring 46 which is attached at one end to carriage body 36 and at the other end to end piece 42. Rod 40 passes through tension spring 48 which is attached at one end to carriage body 36 and at the other end to end piece 44. The orientation of the holes in the support block is such as to only allow radially inward and outward motion of the lever arm. The upper and lower lengths of the lever arms can be unequal. There are two ways in which the ratio of the upper to lower lever arm could be specified, depending on the result desired. In the side view of FIG. 1D, only end piece 44, spring 48 and rod 40 are shown relative to carriage body 36 because the remaining elements of FIG. 1C are obscured. Note that one alternate configuration would place the stator positioner inside the radius of the rotor. In such a configuration, the spring would be a compression spring.

If the criterion is to preserve a constant gap during the expansion and contraction of the rotor, the design criterion for the lever arm length ratio is to make it equal to the ratio of the inner to outward radius of the rotor, so that the case the outward motion of the inner surface as a result of centrifugal forces will cause the lower end of the lever to move radially by the same distance as does the outer surface. The driving force to move the lever arm is the repelling force between the rotating and stationary magnet arrays. To ensure that the gap between the magnets remains constant under expansion of the rotor, the tension springs described above are needed. This spring acts to produce an outward force on the carriage that couples the motion of the bottom of the lever arm to the stator support. The spring constant and the preloaded force exerted by these springs must be high enough to ensure that the gap between the faces of the rotating magnet ring and the stationary magnet arrays is small and remains constant. The spring constant also should be much higher than the electrostatic "spring constant" associated with the sector of the stator electrodes of the electrostatic generator motor. The springs should also be long enough to ensure that their spring constant is indeed "constant" over the range of motion associated with the rotor expansion and contraction. Thus, this first overall magnetic/mechanical design should be able to produce an inward and outward motion of the stator segments that closely matches the expansion and contraction of the outer rotor surface.

An alternative criterion for the determination of the ratio of the lever arm lengths would occur, for example, in a situation where the output power of these generators at their full rotating speed could be substantially higher than that required to meet the discharge-time required. In this case the lever arm could be designed to make the stator-rotor gap largest at the fully charged rpm, decreasing the gap as the speed dropped until it reached the minimum gap at the "discharged" speed—e.g., at 50 percent of the maximum speed (i.e., extraction of 75 percent of the stored energy in the charged state). This design, if necessary, could be coupled with a charging voltage that increased as the speed decreased, thereby allowing the power output to be essentially independent of rotor speed.

Figure 2:
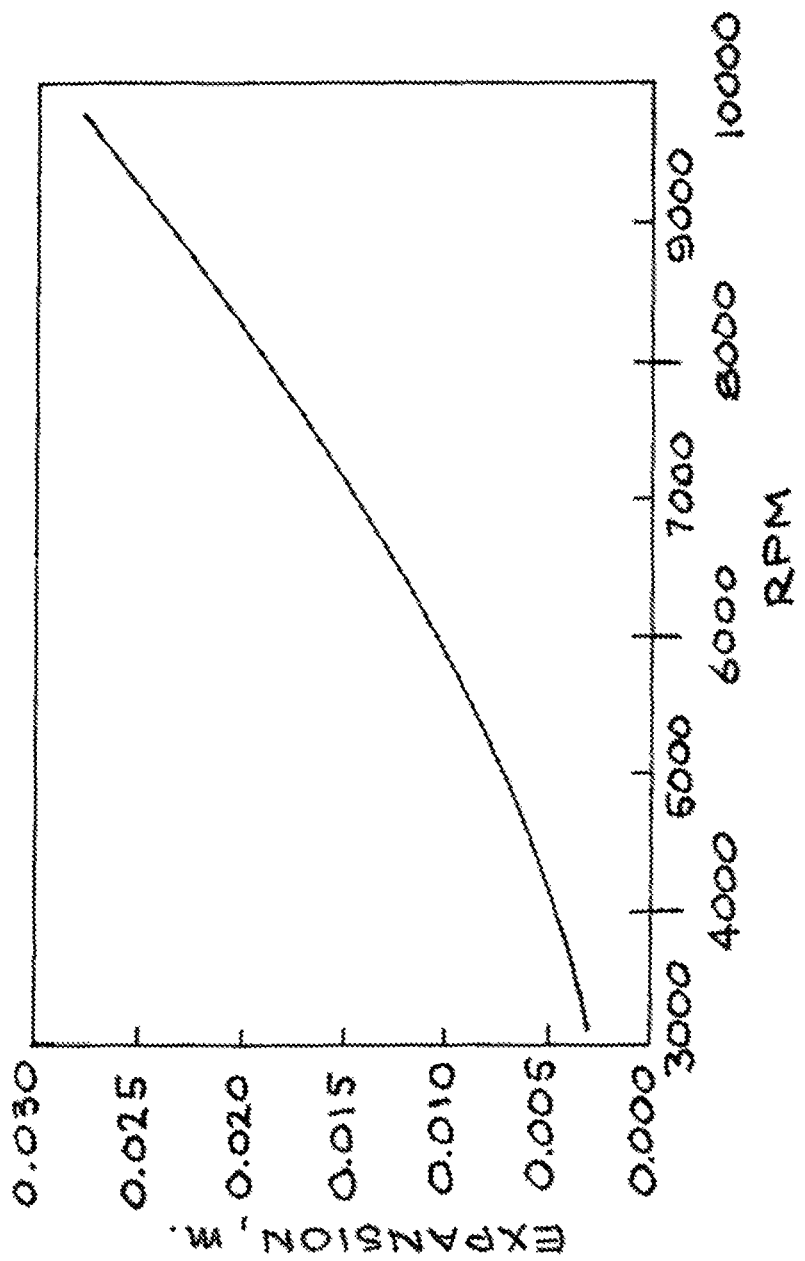
FIG. 2 is a plot of the expansion of a 2.0 meter outer diameter rotor as a function of rotation speed.
Figure 3:
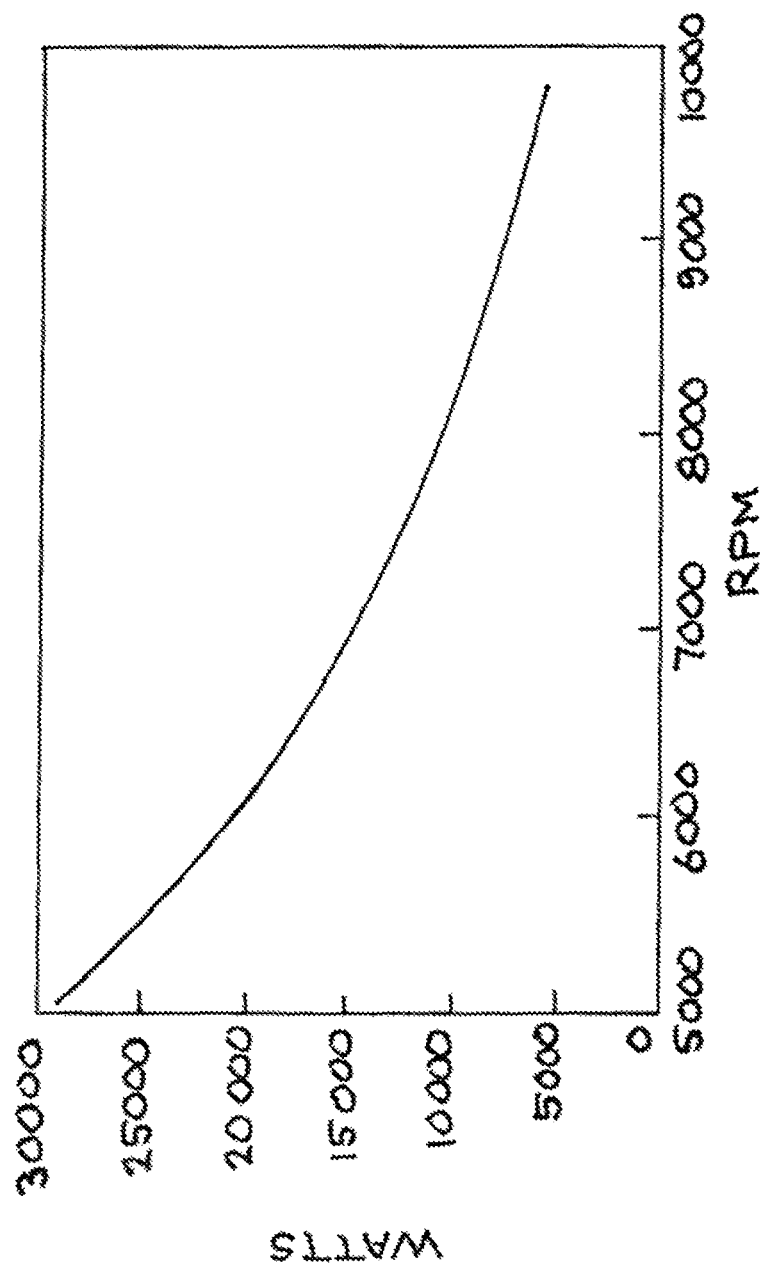
FIG. 3 shows the effect that having no compensation for the change in gap with change in rpm would have on the power output for the case where the design gap occurs at the lowest rpm, but the gap increases with increasing speed.

FIG. 2 is a plot of the expansion of a 2.0 m outer diameter rotor as a function of rotation speed. FIG. 3 shows the effect that having no compensation for the change in gap with change in rpm would have on the power output. In this case the design gap occurs at the lowest rpm, but the gap increases with increasing speed.

FIG. 3 shows the variation of output power as a function of rpm resulting from uncompensated expansion. The gap is 3 mm at the lowest speed and increases to 28 mm at the highest speed. The maximum voltage allowed between the stator and rotor electrodes is held fixed at 35 kV.

Figure 4:
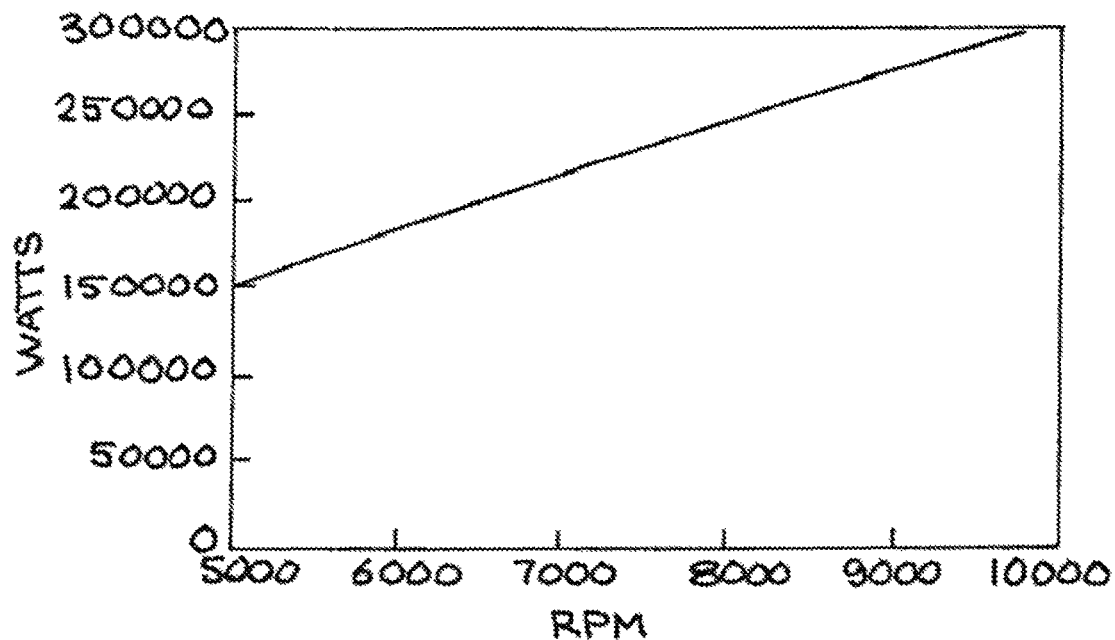
FIG. 4 shows the calculated power output with a fixed maximum rotor-stator voltage of 35 kV.
Figure 5:
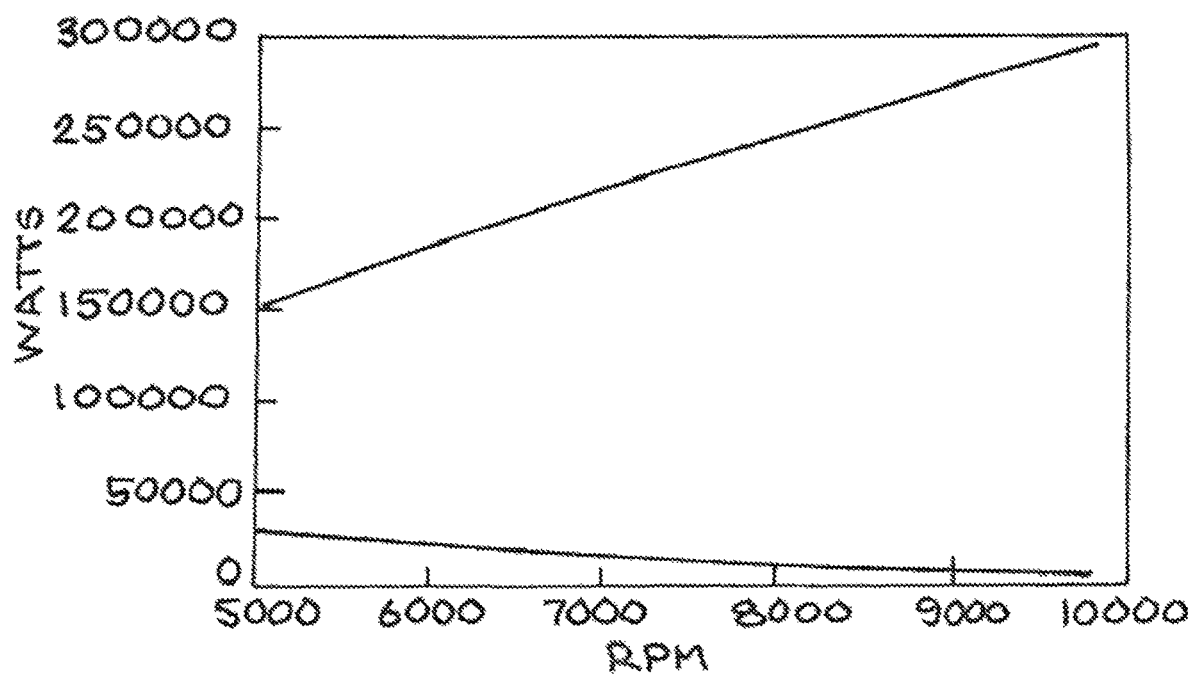
FIG. 5 shows the data from FIGS. 3 and 4 plotted together.

When the stator positioner is used, and the lever arm ratio is adjusted so that the gap remains constant at 2.0 mm, the power output is much larger at all speeds. FIG. 4 shows the calculated power output, again with a fixed maximum rotor-stator voltage of 35 kV. FIG. 4 is a plot of power vs rpm when the gap is held constant at 2.0 mm. FIG. 5 shows the data from FIGS. 3 and 4 plotted together.

The data shown in FIG. 4 depicts the improved performance resulting from keeping the stator-rotor electrode gap constant as a function of rotation speed. Still further improvement, resulting in a power output that is, for the case depicted above, essentially independent of rotation speed between the 5000 and 10000 rpm, can be accomplished in two ways. The first is to vary the maximum allowed inter-electrode voltage to vary above and below the value given above by about ±10 kV, resulting in a constant output of 250 KW over the entire speed range. A second way to keep the output constant, mentioned earlier, would be to adjust the lever-arm ratio so that the gap decreases as the rotation speed decreased, while holding the stator-rotor gap voltage constant. Alternatively, a combination of the two approaches could be used.

Figure 6:
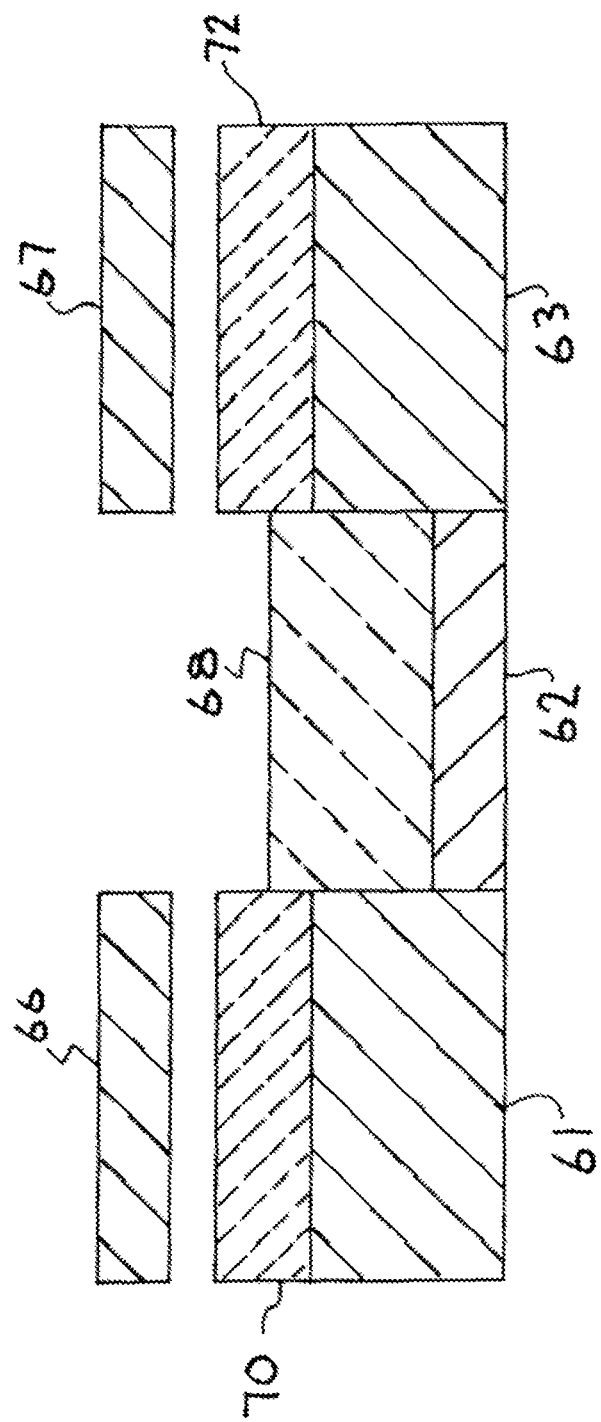
FIG. 6 is a schematic axial view showing sectional views of an exemplary stator electrodes and rotor electrodes of an embodiment of the present invention.

As mentioned above, there is concept applied to an electrode geometry, described in U.S. patent application Ser. No. 14/198,538, published as US 2014-0252914 A1, incorporated herein by reference, that is particularly suitable for use with the stator positioner system just described. The concept is to employ a stator electrode geometry that involves sections that alternate between sections with a high dielectric constant layer on the face of a conducting backing, and sections with a low dielectric constant. In the cited application, these dielectric facings were shown as all being of the same thickness, and the gap between their face and the face of the rotor electrodes was the same for both the high dielectric constant pie sections and the low dielectric ones. The new feature being proposed here is to further improve the performance (as measured by an increase in the ratio of the maximum capacity to the minimum capacity). First, a modification is made of the relative thickness of the dielectrics (the high dielectric pie sections being thinner than the low dielectric ones). Second, a modification is made of the gap between the face of the high dielectric constant sections and that of the low dielectric constant ones, with that of the low dielectric constant sections being wider than that of the high dielectric constant ones. FIG. 6 is a schematic axial view (where the axis is perpendicular to the plane of the page) that illustrates these changes, showing sectional views of the stator electrodes 61-63 and rotor electrodes 66 and 67. The stator electrodes comprise low dielectric section 68 in between high dielectric constant sections 70 and 72. Each one of these rotor segments is small compared to the radius of the rotor so that there is very little gap between the corners of the segments that are furthest away from the axis 8. Thus, even though the segments have no curvature in this embodiment, they can be arranged in a circle with the dielectric sections facing the electrodes of the rotor. One embodiment of the EMB configures the electrodes of each of two stators in a cylindrical shape where both stators have the same radius and are centered on same axis 8 as well as spaced apart with a small gap between the two stators. On the inside of the stator is located a cylindrical shaped rotor with electrodes that are parallel to axis 8 where such electrodes extend the full length from furthest ends of the two first stators. Such a configuration can utilize a balanced circuit such as the shown in FIG. 2 of U.S. patent application Ser. No. 13/796,678. The configuration can be reversed such that the dielectric material of each stator is facing away from axis 8 and the rotor is located on the outside of the stator.

As can be seen from FIG. 6, not only does the dielectric constant of the pie sections vary between low and high value, but also the dielectric thickness and the gap between the face of the dielectric and the rotor electrodes also varies between the two. Among the possible high dielectric constant polymers that could be used is Tedlar®, with a dielectric constant of 11.0 and a dielectric strength of 35 kV/mil (140.0 kV/mm). A possible low dielectric constant polymer is polyelthelene, with a dielectric constant of 2.2 and a dielectric strength of 5.0 kV/mil (200.0 kV/mm).

Using the parallel-plate condenser formula (accurate in the limit of gaps small compared to the plate dimensions) an example of the simple form of variable dielectric constant stator as described in U.S. patent application Ser. No. 14/198,538, (incorporated herein by reference) was calculated. Holding the rotor electrode area and minimum gap the same, this calculation was then repeated for the new stator design described above. The results of these two calculations are listed below, showing an example of the improvement of performance (increased maximum to minimum capacity ratio) that is possible with the new design.

TABLE 1

| Example | Low K Gap | High K Gap | Low K Thk. | High K Thk. | Max. Cap | Min. Cap | Ratio |
|---|---|---|---|---|---|---|---|
| A | 1.0 mm | 1.0 mm | 10.0 mm | 10.00 mm | 33.5 pf | 12.8 pf | 2.60 |
| B | 2.0 mm | 1.0 mm | 10.0 mm | 0.5 mm | 61.2 pf | 10.7 pf | 5.70 |

As can be seen from Table 1, a substantial gain in the capacity ratio, which will result in a major increase in the calculated output of the E-S generator, can be achieved by the new features of varying the relative thickness and the vacuum gaps of the dielectric portions of the rotor-stator assembly.

The same general principle of the present invention can also be applied to an electrostatic generator rotor electrode array mounted on an annular disc at the top of the rotor, in order to compensate for the "Poisson Ratio" axial contraction of the rotor that always accompanies the expansion of the rotor caused h centrifugal force. In a large (one to two m diameter) rotor this contraction could be a centimeter or more.

Figure 7:
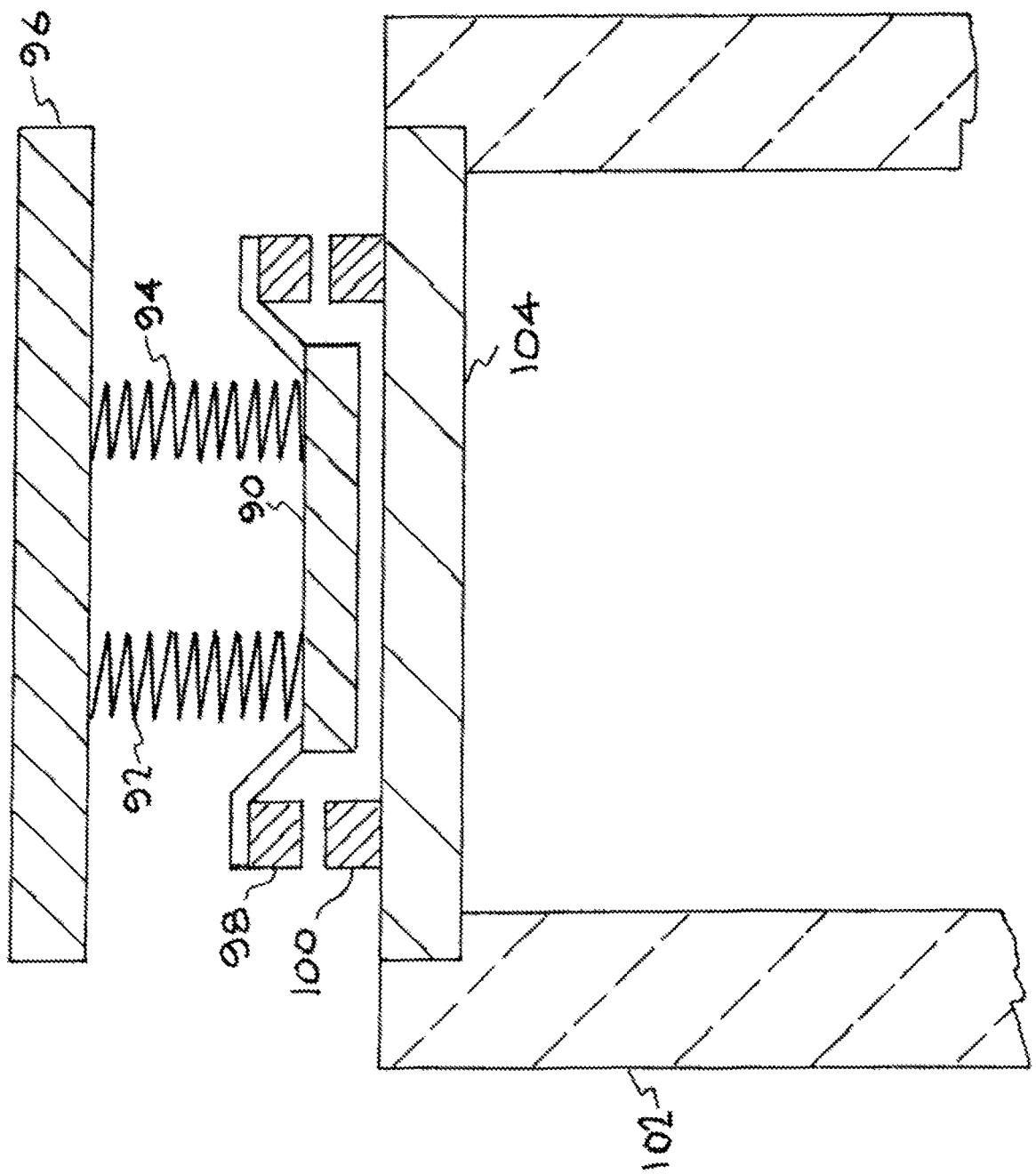
FIG. 7 shows an electrostatic generator rotor electrode array mounted on an annular disc at the top of the rotor, in order to compensate for the "Poisson Ratio" axial contraction of the rotor that always accompanies the expansion of the rotor caused by centrifugal force.

FIG. 7 is a cross-section view schematic drawing that depicts the principal elements of the concept. The stator electrode array 90 is shown as being supported in part by compression springs 92 and 94 and guide rods (e.g., not shown but inside the springs). The compression springs are in contact with support structure 96. The ends of the support rods can be located in through-holes in the support structure 96. The balance of the support is then provided by the repelling magnet rings 98 and 100. As the rotor 102 shrinks in length in the axial direction, due to the axial contraction of rotor, the stator array will then follow it, thus maintaining the gap essentially constant. Since there are electrostatic forces between the stator and rotor electrodes 104, the stiffness and force of the springs and magnets needs to be large enough to make the effect of these forces small enough to have a minimal effect on the operation of the positioner. As a result of this disclosure, alternate geometries may be apparent to those skilled in the art. For example, the spring can be a tension spring and the magnets can have attracting polarizations.

A modification to the design of the concept described in the first section of this disclosure has been described that employs the same general principles of that concept to maintain the rotor-stator gap constant under the shrinkage in length of a spinning rotor that accompanies its expansion under centrifugal forces.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

I claim:

1. An apparatus, comprising:
a rotor having a cylindrical shape with a first end, a second end and a central longitudinal axis of rotation;
a first magnet ring affixed to said first end of said rotor;
first electrodes affixed to said first end;
a mounting element;
a stator;
a second magnet ring fixedly attached to said stator, wherein said first magnet ring and said second magnet ring are operatively spaced so that their respective magnetic fields can interact with each other;
second electrodes affixed to said stator, wherein said first electrodes and said second electrodes are operatively spaced apart at a first gap; and
at least one spring having a first end and a second end, wherein said first end is connected to said mounting element and wherein said second end is connected to said stator, wherein said first magnet ring and said second magnet ring together with said at least one spring are configured to maintain said first gap at all speeds of said rotor.

2. The apparatus of claim 1, wherein to maintain said first gap, said first magnet ring and said second magnet ring are configured to magnetically oppose one another and wherein said at least one spring is a compression spring.

3. The apparatus of claim 2, wherein as the rotor speed increases and the axial length of said rotor decreases, the force of said compression spring pushes said second electrodes toward said first electrodes, wherein said first magnet ring and said second magnet ring magnetically oppose one another to maintain said first gap.

4. The apparatus of claim 1, wherein to maintain said first gap, said first magnet ring and said second magnet ring are configured to magnetically attract one another and wherein said at least one spring is a tension spring.

5. The apparatus of claim 4, wherein as the rotor speed increases and the axially length of said rotor decreases, said first magnet ring and said second magnet ring magnetically attract one another to pull said second magnet ring toward said first magnet ring, wherein said tension spring pulls said second electrodes away said first electrodes to maintain said first gap.

6. The apparatus of claim 1, wherein said at least one spring provides a first force that pushes said stator and said stator electrodes toward said rotor and said rotor electrodes and wherein said first magnet ring and said second magnet ring provide a second force that pushes said stator and said stator electrodes away from said rotor and said rotor electrodes.

7. The apparatus of claim 1, wherein said at least one spring provides a first force that pulls said stator and said stator electrodes away from said rotor and said rotor electrodes and wherein said first magnet ring and said second magnet ring provide a second force that pulls said stator and said stator electrodes toward said rotor and said rotor electrodes.

8. The apparatus of claim 1, wherein the stiffness and force of between said first electrodes and said second electrodes and the stiffness and force of said at least one spring is greater the electrostatic forces between said first electrodes and said second electrodes.

9. The apparatus of claim 1, wherein said second electrodes comprise an electrode geometry comprising alternating sections of a relatively high dielectric constant layer and a relatively low dielectric constant layer, wherein said alternating sections are on the face of at least one conductive backing layer.

10. The apparatus of claim 9, wherein the thickness of said relatively low dielectric constant layer is less than the thickness of said relatively high dielectric constant layer.

11. The apparatus of claim 10, wherein the total combined thickness of said at least one conductive backing layer and said relatively low dielectric constant layer is less than the total combined thickness of said at least one conductive backing layer and said relatively high dielectric constant layer.

12. The apparatus of claim 11, wherein said first gap is the space between said relatively high dielectric constant layer and said first electrodes, wherein a second gap exists between said relatively low dielectric constant layer and said first electrodes, wherein said second gap is larger than said first gap.

13. A method, comprising:
providing an apparatus, comprising
a rotor having a cylindrical shape with a first end, a second end and a central longitudinal axis of rotation;
a first magnet ring affixed to said first end of said rotor;
first electrodes affixed to said first end;
a mounting element;
a stator;
a second magnet ring fixedly attached to said stator, wherein said first magnet ring and said second magnet ring are operatively spaced so that their respective magnetic fields can interact with each other;
second electrodes affixed to said stator, wherein said first electrodes and said second electrodes are operatively spaced apart at a first gap; and
at least one spring having a first end and a second end, wherein said first end is connected to said mounting element and wherein said second end is connected to said stator, wherein said first magnet ring and said second magnet ring together with said at least one spring are configured to maintain said first gap at all speeds of said rotor; and
rotating said rotor.

14. The method of claim 13, wherein to maintain said first gap, said first magnet ring and said second magnet ring are configured to magnetically oppose one another and wherein said at least one spring is a compression spring.

15. The method of claim 14, wherein as the rotor speed increases and the axial length of said rotor decreases, the force of said compression spring pushes said second electrodes toward said first electrodes, wherein said first magnet ring and said second magnet ring magnetically oppose one another to maintain said first gap.

16. The method of claim 13, wherein to maintain said first gap, said first magnet ring and said second magnet ring are configured to magnetically attract one another and wherein said at least one spring is a tension spring.

17. The method of claim 16, wherein as the rotor speed increases and the axially length of said rotor decreases, said first magnet ring and said second magnet ring magnetically attract one another to pull said second magnet ring toward said first magnet ring, wherein said tension spring pulls said second electrodes away said first electrodes to maintain said first gap.

18. The method of claim 13, wherein said second electrodes comprise an electrode geometry comprising alternating sections of a relatively high dielectric constant layer and a relatively low dielectric constant layer, wherein said alternating sections are on the face of at least one conductive backing layer.

19. The method of claim 18, wherein the thickness of said relatively low dielectric constant layer is less than the thickness of said relatively high dielectric constant layer.

20. The method of claim 19, wherein the total combined thickness of said at least one conductive backing layer and said relatively low dielectric constant layer is less than the total combined thickness of said at least one conductive backing layer and said relatively high dielectric constant layer.

21. The method of claim 20, wherein said first gap is the space between said relatively high dielectric constant layer and said first electrodes, wherein a second gap exists between said relatively low dielectric constant layer and said first electrodes, wherein said second gap is larger than said first gap.

\* \* \* \* \*